(12) United States Patent
Murakami et al.

(10) Patent No.: US 6,896,023 B2
(45) Date of Patent: May 24, 2005

(54) APPARATUS FOR CURING ADHESIVE APPLIED TO WATERCRAFT BODY

(75) Inventors: Masatoshi Murakami, Hamamatsu (JP); Toshihiro Tsuchiya, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 373 days.

(21) Appl. No.: 10/308,423

(22) Filed: Dec. 3, 2002

(65) Prior Publication Data

US 2003/0102089 A1 Jun. 5, 2003

(30) Foreign Application Priority Data

Dec. 4, 2001 (JP) ....................................... 2001-370312

(51) Int. Cl.[7] ............................................... B32B 31/26
(52) U.S. Cl. ........................ 156/381; 156/82; 156/497; 156/499
(58) Field of Search ........................... 156/71, 82, 381, 156/497, 499, 574; 432/120

(56) References Cited

U.S. PATENT DOCUMENTS 4,464,831 A * 8/1984 Weber et al. ................. 29/825
5,419,799 A * 5/1995 Lind et al. .................. 156/381
6,660,087 B2 * 12/2003 Murakami et al. .......... 118/323

* cited by examiner

Primary Examiner—James Sells
(74) Attorney, Agent, or Firm—Rankin, Hill, Porter & Clark LLP

(57) ABSTRACT

Framework, defining a predetermined curing area, corresponds in size and shape to a provisionally-assembled watercraft body to be subjected to adhesive curing. Openable/closeable gate, constituting one end portion of the framework, allows the provisionally-assembled watercraft body to be carried therethrough into the curing area. Positioning mechanism positions the carried provisionally-assembled watercraft body in the curing area. Warm air blowing mechanism includes a plurality of nozzles provided at predetermined intervals on and along upper horizontal portions of the framework and gate and at a level slightly higher than peripheral edges of a hull and deck of the watercraft body to be joined by adhesive, which blow warm air downward onto the peripheral edges of the watercraft body.

4 Claims, 9 Drawing Sheets

APPARATUS FOR CURING ADHESIVE APPLIED TO WATERCRAFT BODY

FIELD OF THE INVENTION

The present invention relates to apparatus for curing adhesive, applied between respective predetermined peripheral edges of a hull and deck of a provisionally-assembled watercraft body, in order to join the hull and deck together and thereby provide a fully-assembled watercraft body.

BACKGROUND OF THE INVENTION

There have been known personal watercrafts including a jet pump provided at a rear end portion of the watercraft body, which draws in water through the watercraft bottom by means of the jet pump driven by an engine and runs forward by jetting the thus drawn-in water rearward of the stern.

FIG. 9 hereof is a view explanatory of an example of the conventional manner of joining components of a watercraft body 10 by adhesive. First, adhesive 103 is applied to a peripheral edge 101a and upward protruding portions 101b of a hull 101 loaded on a cart 102; the hull 101 forms a lower half section of the watercraft body 10. Then, a deck 105 forming an upper half section of the watercraft body 10 is overlaid on the hull 101 in such a manner that a peripheral edge 105a of the deck 105 is positioned in overlapping relation with the peripheral edge 101a of the hull 101. Then, the adhesive 103 is cured to secure the peripheral edge 105a of the deck 105 to the peripheral edge 101a of the hull 101, to thereby provide a fully-assembled watercraft body 10.

In ordinary cases, the curing of the adhesive 103 after the deck 105 has been overlaid on the hull 101 is effected by "natural curing"; however, if the adhesive 103 is cured naturally with the deck 105 overlaid on the hull 101, a relatively long time is necessary for curing the adhesive 13, which would lead to poor productivity. To reduce the necessary curing time, the provisionally-assembled watercraft body 100 may be carried into a curing furnace so that the adhesive 103 applied between the peripheral edges 101a and 105a of the hull 101 and deck 105 can be cured in a curing furnace at higher speed. However, such a curing furnace tends to require a relatively great installation space and large-scale equipment, which would greatly increase the manufacturing cost of the personal watercraft.

SUMMARY OF THE INVENTION

In view of the foregoing prior art problems, it is an object of the present invention to provide an improved adhesive curing apparatus for use in watercraft body assembly which can reduce a necessary adhesive curing time and cost.

To accomplish the above-mentioned object, the present invention provides an adhesive curing apparatus for curing adhesive applied between respective peripheral edges of a hull and deck of a provisionally-assembled watercraft body, which comprises: a framework corresponding in size and shape to the provisionally-assembled watercraft body to be subjected to adhesive curing, the framework defining a predetermined curing area; an openable/closeable gate constituting one end portion of the framework, the gate allowing the provisionally-assembled watercraft body to be carried therethrough into the curing area in a stern-to-bow or bow-to-stern direction of the watercraft body; a positioning mechanism for positioning the carried provisionally-assembled watercraft body in a predetermined position of the curing area such that the framework surrounds the provisionally-assembled watercraft body positioned in the curing area; and a warm air blowing mechanism for blowing warm air onto the provisionally-assembled watercraft body positioned by the positioning mechanism.

In the present invention, the provisionally-assembled watercraft body to be subjected to adhesive curing can be readily carried into the curing area through the gate without requiring a long time, and the warm air blowing mechanism can cure the adhesive with an increased efficiency by blowing warm air onto the peripheral edges of the provisionally-assembled watercraft body positioned in the curing area.

In a preferred embodiment of the present invention, the framework and the gate have upper horizontal portions located generally at the same level as the peripheral edges of the provisionally-assembled watercraft body positioned in the curing area, and the warm air blowing mechanism includes a plurality of nozzles mounted at predetermined intervals on and along the upper horizontal portions of the framework and the gate. Thus, each of the nozzles is located, at a level substantially higher than the peripheral edges of the provisionally-assembled watercraft body positioned in the curing area, to eject warm air downward toward the peripheral edges. Because the upper horizontal portions of the framework and gate having the nozzles mounted thereon are at the generally same level as the peripheral edges of the provisionally-assembled watercraft body positioned in the curing area, the height of the framework can be minimized to generally the same level of the peripheral edges of the provisionally-assembled watercraft body; thus, the framework can have a relatively small height or low profile, which can reduce the necessary installation space of the adhesive curing apparatus. The provision of the plurality of nozzles, mounted at predetermined intervals on and along the upper horizontal portions of the framework and the gate, permits curing of the adhesive with an even further efficiency. Further, because the nozzles are located at a level substantially higher than the peripheral edges of the provisionally-assembled watercraft body, it is possible to prevent the watercraft body from interfering the nozzles even when the watercraft body has, by some chance, displaced sideways. In addition, because the nozzles are oriented to eject warm air downward toward the peripheral edges of the watercraft body, the warm air spouts of the nozzles can be positioned close to the peripheral edges of the provisionally assembled watercraft body, so that the warm air can be blown on to the peripheral edges more effectively and thus the adhesive can be cured with an even further efficiency.

In a preferred embodiment, the positioning mechanism includes a guide rail extending centrally of the curing area for guiding the provisionally-assembled watercraft body, carried into the curing area through the gate, toward another end portion of the framework opposite to the gate. With the guide rail extending centrally of the curing area, the provisionally-assembled watercraft body can be positioned accurately in its widthwise direction or with respect to opposed sides of the framework or curing area.

The positioning mechanism may also include a frame member that is provided at the other end portion of the framework and movable (e.g., slidable) toward or away from the gate so as to be adjustable in position in accordance with a dimension (length), in a front-and-rear direction, of each provisionally-assembled watercraft body to be carried into the curing area. Generally, there are four types of watercrafts and hence bodies: one for one person; one for two persons; one for three persons; and one for four persons. These four types of watercraft bodies have generally the same width although they have different lengths. Where the provisionally-assembled watercraft body to be subjected to adhesive curing has a relatively great length, the movable frame member constituting the other end portion of the framework is set to a position farther from the gate, while where the provisionally-assembled watercraft body has a relatively small length, the movable frame member is set to a position closer to the gate. With this arrangement, the same adhesive curing apparatus can be applied to the different types of watercraft bodies.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
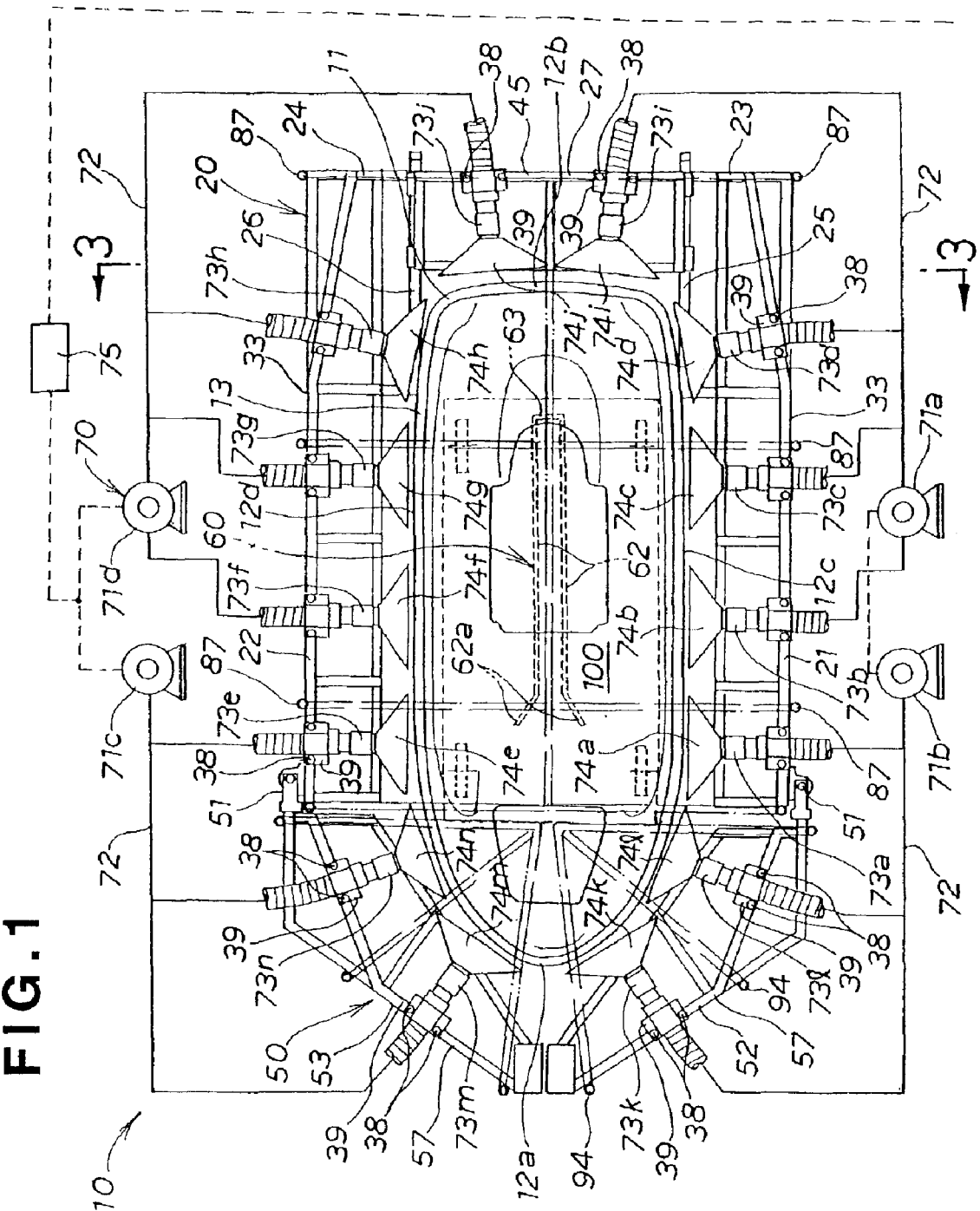
FIG. 1 is a plan view of an adhesive curing apparatus in accordance with an embodiment of the present invention, which is intended for use in assembly of a watercraft body.

Initial reference is taken to FIG. 1 illustrating in lop plan an adhesive curing apparatus 10 in accordance with an embodiment of the present invention, which is intended to cure adhesive applied between respective peripheral edges of a hull and deck of a provisionally-assembled watercraft body. The adhesive curing apparatus 10 includes: a framework 20 capable of surrounding a provisionally-assembled watercraft body 11 to be subjected to adhesive curing and corresponding in size and shape to the provisionally-assembled watercraft body 11; an openable/closeable gate 50 constituting one end portion of the framework 20 to allow the watercraft body 11 to be carried therethrough into or out of a curing area 100, defined by the framework 20, from a stern portion 12b (in a stern-to-bow direction) or bow portion 12a (in a bow-to-stern direction) of the watercraft body 11; a positioning mechanism 60 for putting the watercraft body 11, carried through the gate 50, in a predetermined position of the curing area 100; a warm air blowing mechanism 70 for blowing warm air (warm air currents) onto peripheral edges (i.e., overlapped peripheral edges of the hull and deck) 13 of the watercraft body 11 positioned by the positioning mechanism 60; and a covering 80 (FIG. 2) removably attached to and cover the framework 20 and gate 50.

Figure 2:
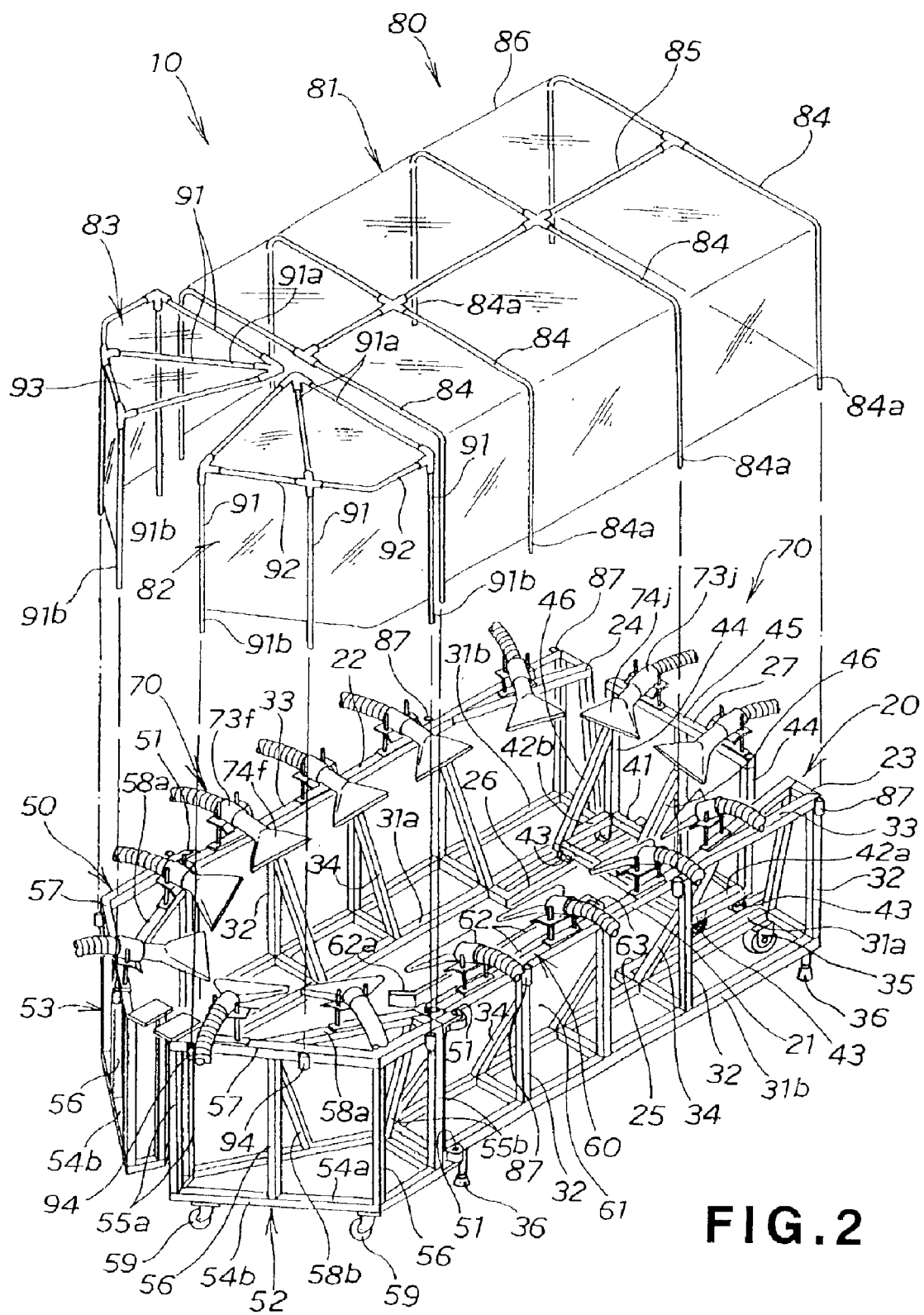
FIG. 2 is a perspective view of the adhesive curing apparatus shown in FIG. 1.

FIG. 2 is a perspective view of the adhesive curing apparatus 10. As shown, the framework 20 includes a left fixed frame 21 extending along a left side surface 12c (FIG. 1) of the watercraft body 11 positioned in the curing area 100, and a right fixed frame 22 extending along a right side surface 12d (FIG. 1) of the watercraft body 11. The framework 20 also includes a left sliding rail 25 connected to a rear end portion 23 of the left fixed frame 21, a right sliding rail 26 connected to a rear end portion 24 of the right fixed frame 22, and a sliding frame 27 slidable, on and along the left and right sliding rail 25 and 26, toward or away from the gate 50 for purposes to be described below.

The left fixed frame 21 includes inner and outer lower support beams 31a and 31b extending in a front-and-rear direction, i.e. along the length, of the watercraft body 11, a plurality of vertical struts 32 fixed at right angles to the outer lower support beam 31b, an upper horizontal support beam 33 fixed to the upper ends of the vertical struts 32, and a plurality of reinforcing bars 34 fixed between the inner lower support beam 31a and the respective struts 32. Thus, the left fixed frame 21 is formed as a generally rectangular frame. The left fixed frame 21 also includes a plurality of casters 35 secured to the underside of the inner lower support beam 31a, and a plurality of lower end supports secured to the underside of the outer lower support beam 31b.

The right fixed frame 22 is constructed in generally the same manner as the left fixed frame 21, and description of the right fixed frame 22 is omitted here; elements of the right fixed frame 22 are denoted in the figure using the same reference numerals as the left fixed frame 21.

The sliding frame 27 is disposed at a rear end portion of the framework 20 which is opposite to the above-mentioned gate 50. The sliding frame 27 includes a lower cross beam 41, left and right frame members 42a and 42b extending from the left and right ends of the lower cross beam 41 toward the gate 50, and a plurality of casters 43 secured to the underside of the frame members 42a and 42b. The casters 43 are positioned on the left and right sliding rails 25 and 26, and two vertical struts 44 are connected at right angles to the rear ends of the left and right frame members 42a and 42b. Further, an upper horizontal beam 45 is secured to the upper ends of the vertical struts 44, and reinforcing bars 46 are connected between the fore ends of the left and right frame members 42a and 42b and the vertical struts 44. In this way, the sliding frame 27 is formed as a generally rectangular frame.

The sliding frame 27 is slidable in the front-and-rear direction, i.e. along the length, of the provisionally-assembled watercraft body 11, via the casters 43 rolling on and along the left and right sliding rails 25 and 26.

Figure 4:
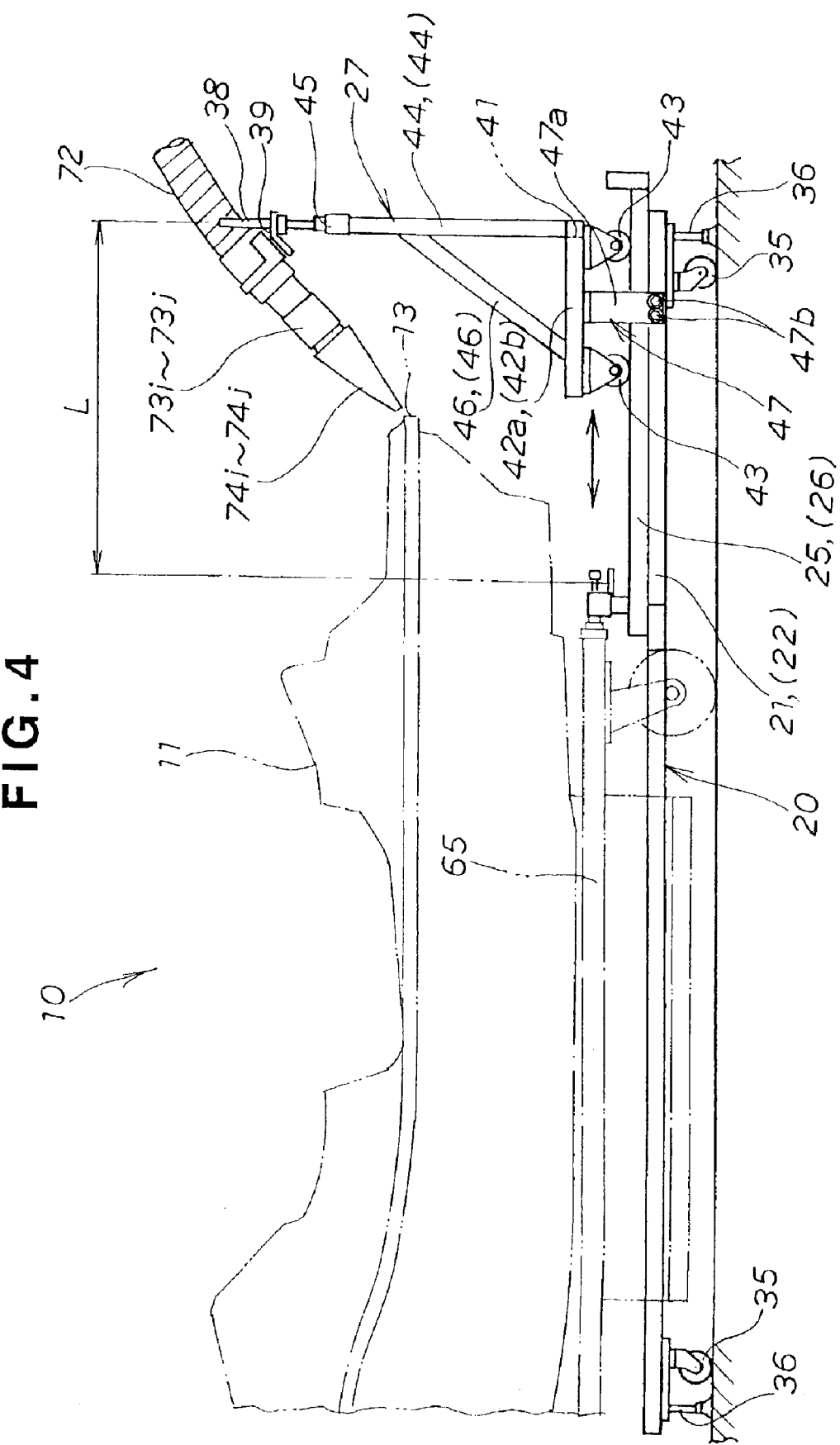
FIG. 4 is a fragmentary enlarged view of the adhesive curing apparatus shown in FIG. 1.

Further, the sliding frame 27 includes a lock mechanism 47 as shown in FIG. 4. For example, the lock mechanism 47 includes two lock plates 47a fixed at their upper ends to the left and right frame members 42a and 42b, respectively, and locking bolts 47b fastening the lower ends of the lock plates 47a to the left and right fixed frames 21 and 22, respectively. The sliding frame 27 can be fixed in a predetermined position with the locking bolts 47b attached to the left and right fixed frame 21 and 22. Note that the construction of the lock mechanism 47 is not limited to the illustrated example; for example, the locking bolts 47b may be replaced with locking pins or locking cylinders.

The gate 50 includes a pair of left and right gate members 52 and 53 pivotally connected, via pivots 51, to the respective fore ends of the left and right fixed frames 21 and 22, so that the gate members 52 and 53 are movable between opened and closed positions.

The left gate member 52 includes inner and outer lower beams 54a and 54b extending obliquely forward from the fore end of the left fixed frame 21, front vertical struts 55a connected at right angles to the respective fore ends of the lower beams 54a and 54b, and rear vertical struts 55b connected at right angles to the respective rear ends of the lower beams 54a and 54b. Further, vertical struts 56 are connected to middle portions of the outer lower beam 54b, and an upper horizontal beam 57, extending obliquely forward along the outer lower beam 54b, is secured to the upper ends of the struts 55a, 55b and 56. Reinforcing bar 58a is connected to the fore end of the upper horizontal beam 57, and another reinforcing member 58b is connected between the inner lower beam 54a and the upper horizontal beam 57. In this way, the left gate member 52 is formed as a rectangular frame. Casters 59 are secured to the undersides of the inner and outer lower beams 54a and 54b. Thus, the left gate member 52 is horizontally pivotable about the upper and lower pivots 51 with the casters 59 rolling on a floor surface.

The right gate member 53 is constructed generally in the same manner as the left gate member 54, and description of the right gate member 53 is omitted here; elements of the right gate member 53 are denoted in the figure using the same reference numerals as the left gate member 54.

The positioning mechanism 60 is intended to position the provisionally-assembled watercraft body 11, carried into the curing area 100 through the gate 50 in the open position, in place within the curing area 100. The positioning mechanism 60 includes a pair of generally parallel guide rails 62 extending, in the same horizontal plane, centrally of the floor surface 61 of the curing area 100 in the front-and-rear direction for guiding the watercraft body 11 as the watercraft body 11 is carried into or out of the curing area 100, a stopper 63 closing open rear ends of the guide rails 62, and a downward projection 66 formed centrally on the underside of a cart 65 for carrying the watercraft body 11 (FIG. 3).

Figure 3:
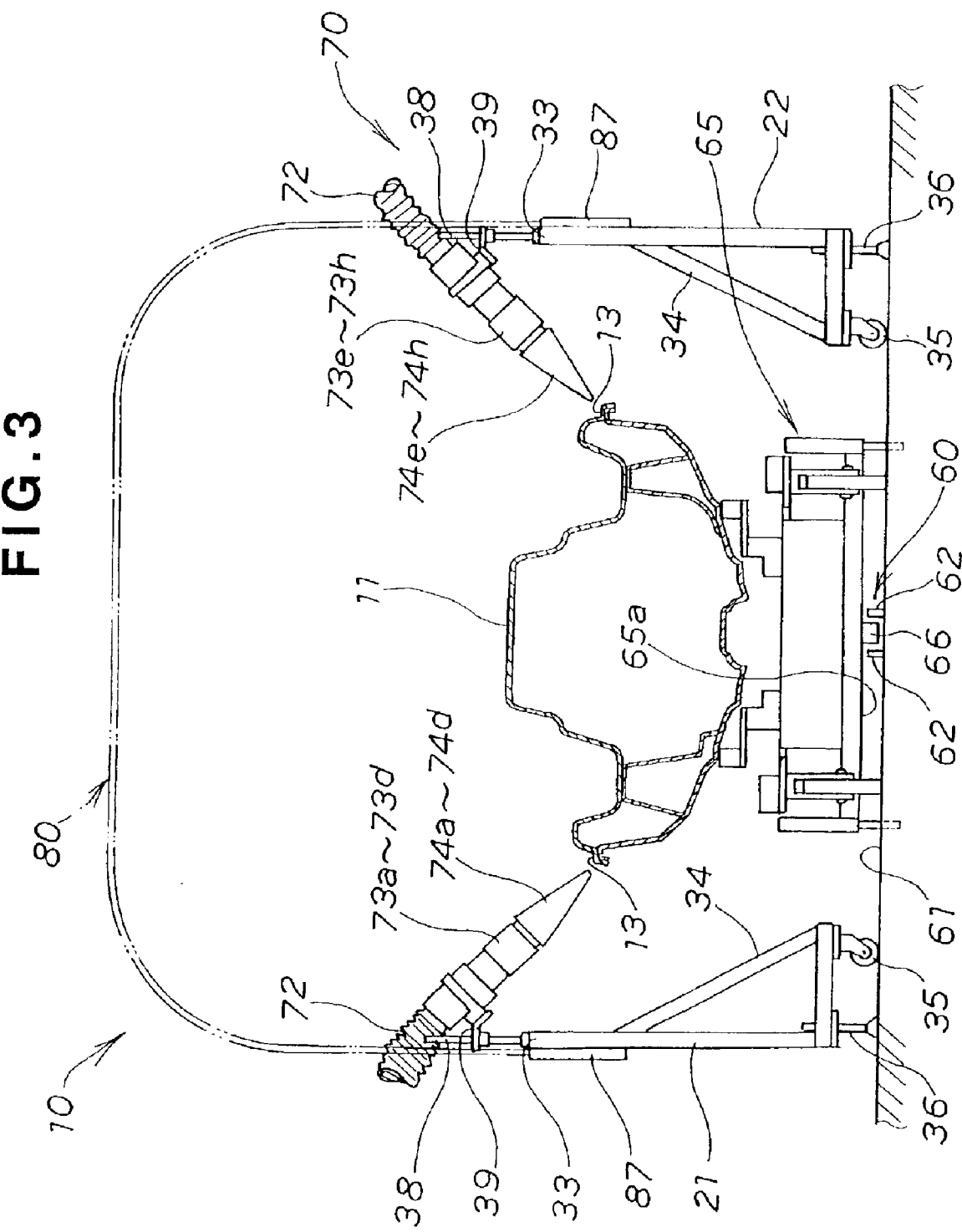
FIG. 3 is a sectional view taken along the 3—3 lines of FIG. 1.

As the cart 65 with the provisionally-assembled watercraft body 11 loaded thereon is transferred through the gate 50 into the curing area 100, the projection 66 of the cart 65 is introduced between the guide rails 62, so that the watercraft body 11 can be automatically positioned appropriately in its widthwise direction, i.e. with respect to the opposed sides of the framework 20 or curing area 100 (see FIG. 3). In addition, the projection 66 of the cart 65 abuts against the stopper 63 when the watercraft body 11 reaches a predetermined position in the curing area 100, by which the watercraft body 11 can be automatically positioned appropriately in its lengthwise direction, i.e. with respect to the opposed ends of the curing area 100 (see FIG. 1).

In the above-described manner, the provisionally assembled watercraft body 11 to be subjected to adhesive curing can be positioned accurately in the curing area 100 of the adhesive curing apparatus 10.

Note that the guide rails 62 have front end portions 62a progressively inclined horizontally outward away from each other, as clearly seen from FIG. 1, to thereby provide a greater entrance opening between the front end portions 62a, so that the projection 66 of the cart 65 can be readily introduced between the guide rails 62 with increased reliability.

Referring back to FIG. 1, the warm air blowing mechanism 70 includes first to fourth blowers 71a to 71d, heaters 73a to 73n communicating via feed pipes 72 with the respective blowers 71a to lid, nozzles 74a to 74n connected with the respective heaters 73a to 73n, and a control 75 for controlling the first to fourth blowers 71a to 71d and heaters 73a to 73n.

The heaters 73a to 73d are mounted on the upper horizontal support beam 33 of the left fixed frame 21, the heaters 73e and 73h mounted on the upper horizontal support beam 33 of the right fixed frame 22, the heaters 73i and 73j mounted on the upper horizontal beam 45 of the sliding frame 27, the heaters 73k and 73l mounted on the upper horizontal beam 57 of the left gate member 52, and the heaters 73m and 73n mounted on the upper horizontal beam 57 of the right gate member 53.

FIG. 3 is a sectional view taken along the 3—3 lines of FIG. 1. The upper horizontal support beam 33 of the left fixed frame 21 is located a little higher than the peripheral edges 13 of the provisionally-assembled watercraft body 11, and four pairs of vertical rods 38, each provided with a support plate 39, are connected to the upper horizontal support beam 33. Four heaters 73a to 73d are mounted, via the respective support plates 39, on and along the beam 33 at predetermined intervals. With the heaters 73a to 73d thus supported on the respective support plates 39, the nozzles 74a to 74d connected to the heaters 73a to 73d can be positioned at a level slightly higher than the peripheral edges 13 of the watercraft body 11, and they can be oriented to eject warm wind downward toward the peripheral edges 13 of the provisionally-assembled watercraft body 11.

Further, the upper horizontal support beams 33 of the right fixed frame 22 is positioned a little higher than the peripheral edges 13 of the watercraft body 11, and four pairs of vertical rods 38, each provided with a support plate 39, are connected to the upper horizontal support beams 33. Four heaters 73e to 73h are mounted, via the respective support plates 39, on and along the beam 33 at predetermined intervals. With the heaters 73e to 73h thus supported on the respective support plates 39, the nozzles 74e to 74h connected to the heaters 73e to 73h can be positioned at a level slightly higher than the peripheral edges 13 of the watercraft body 11, and they can be oriented to eject warm wind downward toward the peripheral edges 13 of the provisionally-assembled watercraft body 11.

Again referring back to FIG. 1, the upper horizontal beam 57 of the left gate member 52 is positioned a little higher than the peripheral edges 13 of the watercraft body 11 similarly to the upper horizontal support beam 33 of the left fixed frame 21, and two pairs of vertical rods 38, each provided with a support plate 39, are connected to the upper horizontal beam 57. Two heaters 73k and 73l are mounted, via the respective support plates 39, on and along the beam 57 at a predetermined interval. With the heaters 73k and 73l thus mounted on the respective support plates 39, the nozzles 74k and 74l connected to the heaters 73k and 73l can be positioned at a level slightly higher than the peripheral edges 13 of the watercraft body 11, and they can be oriented to eject warm air downward toward the peripheral edges 13 of the provisionally-assembled watercraft body 11 similarly to the nozzles 72a to 74d.

The upper horizontal beam 57 of the right gate member 53 is positioned a little higher than the peripheral edges 13 of the watercraft body 11 similarly to the upper horizontal support beam 33 of the right fixed frame 22, and two pairs of vertical rods 38, each provided with a support plate 39, are connected to the upper horizontal. beam 57. Two heaters 73m and 73n are mounted, via the respective support plates 39, on and along the beam 57 at a predetermined interval. With the heaters 73m and 73n thus supported on the respective support plates 39, the nozzles 74m and 74n connected to the heaters 73m and 73n can be positioned at a level slightly higher than the peripheral edges 13 of the watercraft body 11 similarly to the other nozzles 74e to 74h, and they can be oriented to eject warm air downward toward the peripheral edges 13 of the provisionally-assembled watercraft body 11 similarly to the nozzles 74e to 74h.

Also, three heaters 73b to 73d on the left fixed frame 21 and one heater 73i on the sliding frame 27 are connected, via the corresponding feed pipes 72, in communication with the first blower 71a, and one heater 73a on the left fixed frame 21 and two heater 73k and 73l on the left gate member 52 are connected, via the corresponding feed pipes 72, in communication with the second blower 71b.

Further, two heaters 73m and 73n on the right gate member 53 and one heater 73e on the right fixed frame 22 are connected, via the corresponding feed pipes 72, in communication with the third blower 71c, and three heater 73f to 73h on the right fixed frame 22 and one heater 73j on the sliding frame 27 are connected, via the corresponding feed pipes 72, in communication with the fourth blower 71d.

FIG. 4 is a fragmentary enlarged view showing principal parts of the adhesive curing apparatus of the present invention. As clearly seen in the figure, the upper horizontal beam 45 of the sliding frame 27 is positioned a little higher than the peripheral edges 13 of the watercraft body 11, the two pairs of vertical rods 38, each provided with the support plate 39, are connected to the upper horizontal beam 45, and the two heaters 73i and 73j are mounted, via the respective support plates 39, on and along the beam 45 at a predetermined interval. With the heaters 73i and 73j thus supported on the support plates 39, the nozzles 74i and 74j connected to the heaters 73i and 73k can be positioned at a level slightly higher than the peripheral edges 13 of the watercraft body 11 and oriented to eject warm air downward toward the peripheral edges 13 of the provisionally-assembled watercraft body 11.

Because the nozzles 74a and 74n (FIGS. 1 and 2) of the warm air blowing mechanism 70 are positioned slightly higher than the peripheral edges 13 of the watercraft body 11, it is possible to prevent the watercraft body 11 from interfering with the nozzles 74a to 74n even when the watercraft body 11 within the framework 20 has, by some chance, displaced laterally from the predetermined curing position.

Further, with the nozzles 74a and 74n oriented downward, warm air spouts 76a to 76n of the nozzles 74a and 74n can be located close to the peripheral edges 13 of the watercraft body 11, so that warm air can be effectively blown through the spouts 76a to 76n onto the peripheral edges 13. As a consequence, the adhesive can be cured with an even further increased efficiency, which can significantly reduce the necessary curing time.

In addition, because the nozzles 74a and 74n of the warm air blowing mechanism 70 are provided on the framework 20 along the peripheral edges 13 of the provisionally-assembled watercraft body 11, the framework 20 may have a small height or low profile corresponding to the level of the peripheral edges 13 of the watercraft body 11, with the result that the framework 20 can be reduced in size.

Referring back to FIG. 2, the covering 80 includes: a framework covering portion 81 for covering an area over the framework 20; a left-gate covering portion 82, provided forward and leftward of the framework covering portion 81, for covering an area above the left gate member 52; and a right-gate covering portion 83, provided forward and rightward of the framework covering portion 81, for covering an area above the right gate portion 53.

The framework covering portion 81 includes four poles 84, each generally in the shape of an inverted "U", provided at predetermined intervals, a connection rod 85 connecting together respective central regions of the poles 84, and a flexible sheet 86 overlaid on the poles 84. Opposite ends 84a of the four poles 84 are inserted in respective pole support portions 87 (see also FIG. 1) of the framework 20, and thus the sheet 86 can cover the area over the framework 20.

The left-gate covering portion 82 includes three poles 91, each generally in the shape of an inverted "L", disposed in a radial configuration as viewed from above. Distal ends 91a of the three poles 91 are joined together, respective bent portions of the poles 91 are connected together via connecting rods 92, and a flexible sheet 93 is overlaid on the poles 91. The other ends 91b of the poles 91 are inserted in respective pole support portions 94 (see also FIG. 1) of the left gate member 52, and thus the sheet 93 can cover the area over the left gate member 52.

The right-gate covering portion 83 is constructed in generally the same manner as the left-gate covering portion 82, and description of the right-gate covering portion 83 is omitted here; elements of the right-gate covering portion 83 are denoted in the figure using the same reference numerals as the left-gate covering portion 82.

Referring back to FIG. 4, the left and right frame members 42a and 42b in the sliding frame 27 extend from the left and right ends of the lower cross beam 41, and the casters 43 are secured to the underside of the frame members 42a and 42b and are positioned on the left and right sliding rails 25 and 26. Two vertical struts 44 are connected at right angles to the rear ends of the left and right frame members 42a and 42b. Further, the upper horizontal beam 45 is secured to the upper ends of the vertical struts 44, and the reinforcing bars 46 are connected between the fore ends of the left and right frame members 42a and 42b and the vertical struts 44. The sliding frame 27 includes the lock mechanism 47 as shown in FIG. 4. Further, in the sliding frame 27, the two lock plates 47a of the lock 47 are fixed at their upper ends to the left and right frame members 42a and 42b, respectively, and the locking bolts 47b fasten the lower ends of the lock plates 47a to the left and right fixed frames 21 and 22, respectively.

By disengaging the locking bolts 47b from the left and right fixed frames 21 and 22, the sliding frame 27 can be caused to slide in the front-and-rear direction (indicated in the figure by a double-head arrow) of the watercraft body 11 within a predetermined sliding range L, with the casters 43 rolling on and along the left and right slide rails 25 and 26. The sliding frame 27 can be locked in a predetermined position by bringing the locking bolts 47b into engagement with the left and right fixed frames 21 and 22.

Now, a description will be made about behavior of the adhesive curing apparatus 10 of the present invention, with reference to FIGS. 5 to 8.

Figure 5A:
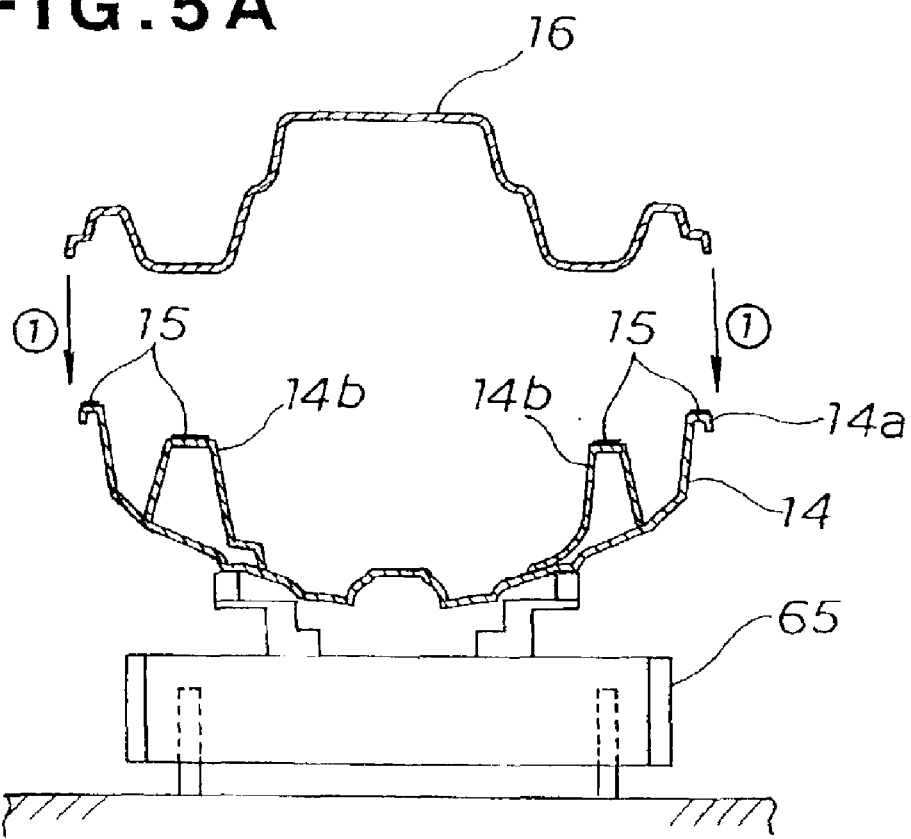
FIG. 5 is a diagram explanatory of operation of the adhesive curing apparatus.

As shown in FIG. 5A, adhesive 15 is applied to a peripheral edge 14a and protruding portions 14b of a hull 14 loaded on the cart 65. Then, a deck 16 is overlaid on the hull 14 as denoted by arrow ①.

Figure 5B:
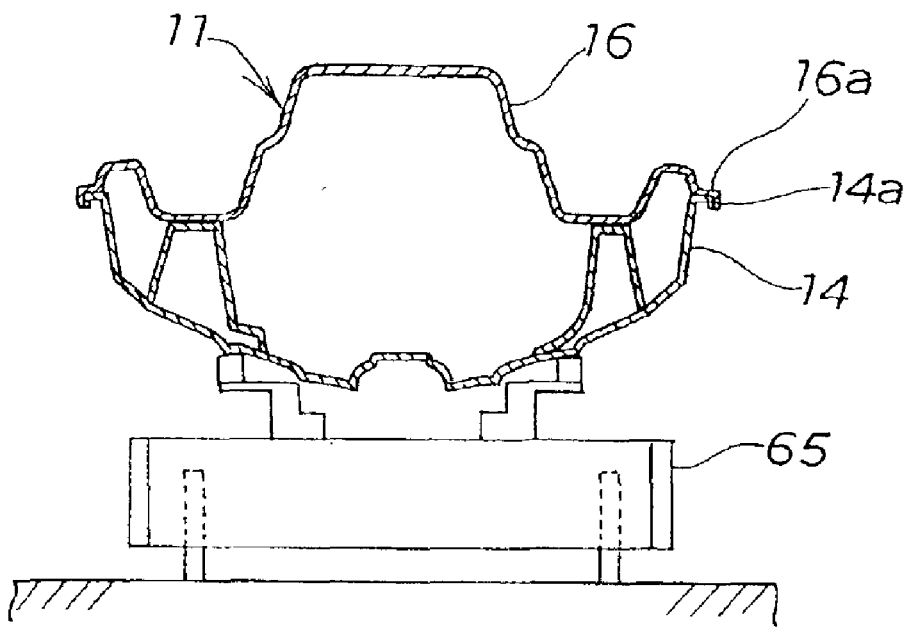

Then, as shown in FIG. 5B, a peripheral edge 16a of the deck 16 is brought into overlapping engagement with the peripheral edge 14a of the hull 14; simultaneously, predetermined lower surface portions of the deck 16 are brought into overlapping engagement with the protruding portions 14b of the hull 14. In this way, a provisionally-assembled watercraft body 11 is provided.

Then, the peripheral edge 14a of the hull 14 and the peripheral edge 16a of the deck 16 are firmly clamped together by means of a plurality of clamps (not shown), with a view to appropriately joining the peripheral edges 14a and 16a.

Figures 6A, 6B:
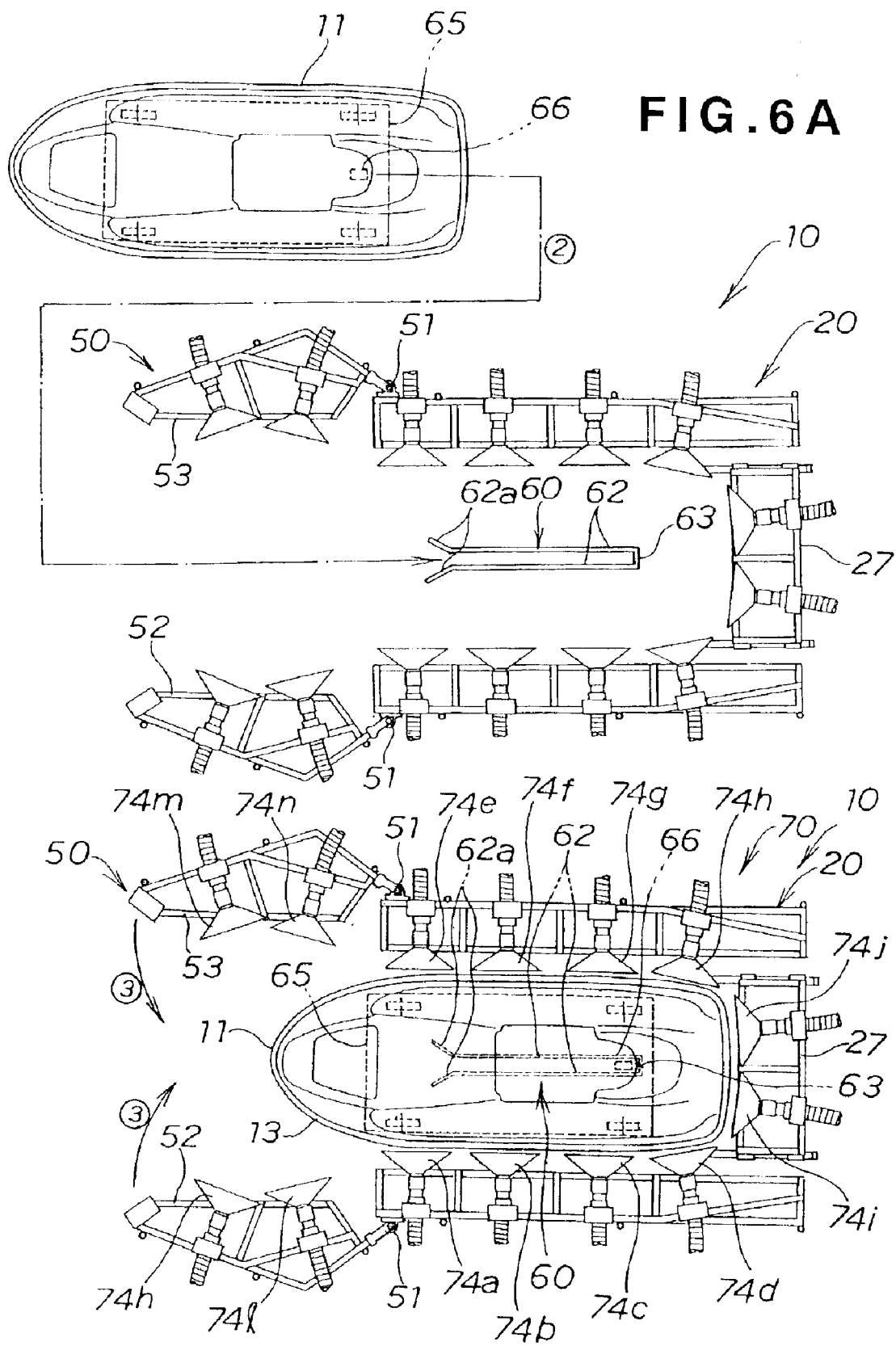
FIG. 6 is also a diagram explanatory of operation of the adhesive curing apparatus.

After that, the left and right gate members 52 and 53 are caused to pivot about the pivots 51 outwardly away from each other, so that the gate 50 is opened, as shown in FIG. 6A. Then, the cart 65 with the provisionally-assembled watercraft body 11 loaded thereon is carried, through the gate 50, into the curing area 100 defined by the framework 20 as denoted by arrow ②. The provision of such a gate 50 allows the provisionally-assembled watercraft body 11 to be readily carried into the curing area 100.

Then, as the cart 65 advances into the curing area 100 as shown in FIG. 6B, the projection 66 of the cart 65 is automatically introduced between the left and right guide rails 62, so that the cart 65 can be appropriately positioned with respect to the left and right sides of the framework 20 and hence the curing area 100. Therefore, the provisionally-assembled watercraft body 11 can be carried into the curing area 100 without interfering with the nozzles 74a to 74n. Further, when the provisionally-assembled watercraft body 11 reaches the predetermined curing position, the projection 66 of the cart 65 abuts against the stopper 63, by which the watercraft body 11 can be positioned appropriately with respect to the front and rear ends of the framework 20 and hence the curing area 100.

After the provisionally-assembled watercraft body 11 has been properly positioned in the curing area 100, the left and right gate members 52 and 53 are caused to pivot about the pivots 51 inwardly toward each other as denoted by arrows ③, so that the gate 50 is closed. Thus closing the gate 50 allows the nozzles 74k to 74n of the warm air blowing mechanism 70, mounted on the gate 50, can be set to properly face a fore end portion of the peripheral edges 13 of the provisionally-assembled watercraft body 11. As a consequence, the portion of the adhesive 15 applied to the fore end portion of the peripheral edges 13 can also be cured efficiently.

Figure 7A:
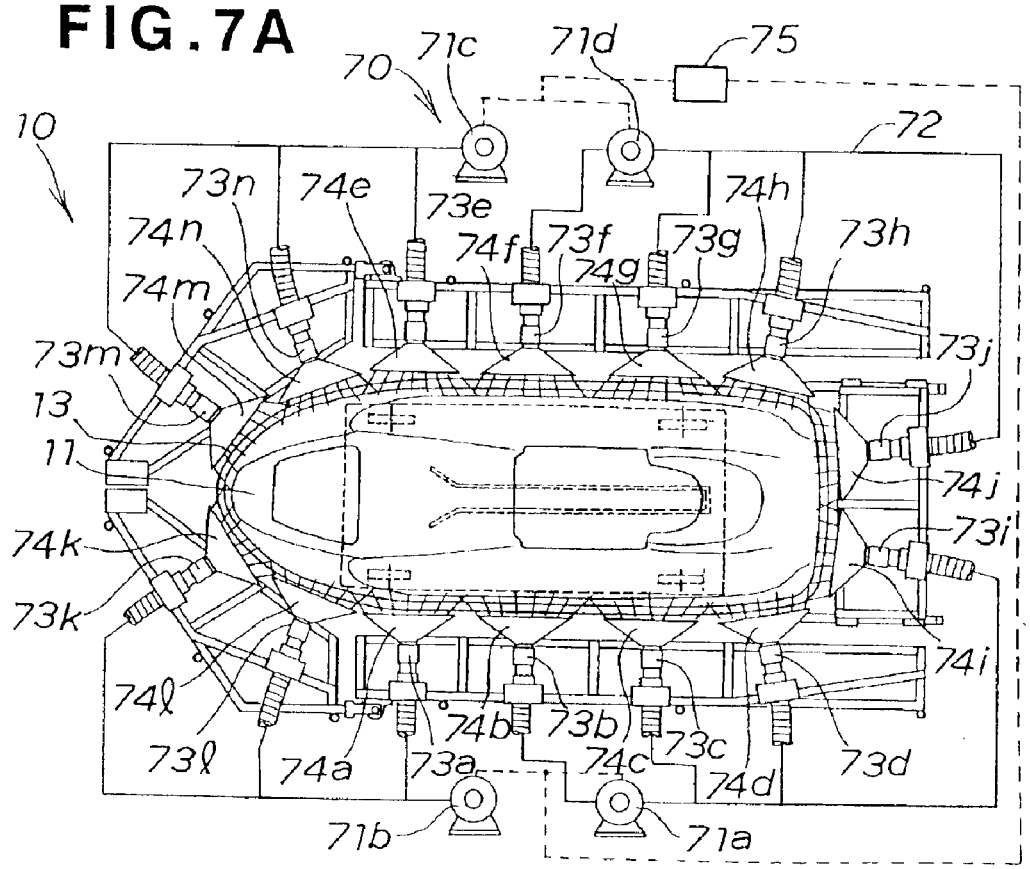
FIG. 7 is also a diagram explanatory of operation of the adhesive curing apparatus.

Then, a predetermined start switch (not shown) is turned on so that the heaters 73a to 73n are activated to initiate their heating operation and the first to fourth blowers 71a to 71d are activated to initiate their blowing operation in response to signals given from the control 75, as shown in FIG. 7A. Thus, warm air is blown from the nozzles 74a to 74n onto the peripheral edges 13 of the provisionally-assembled watercraft body 11.

Figure 7B:
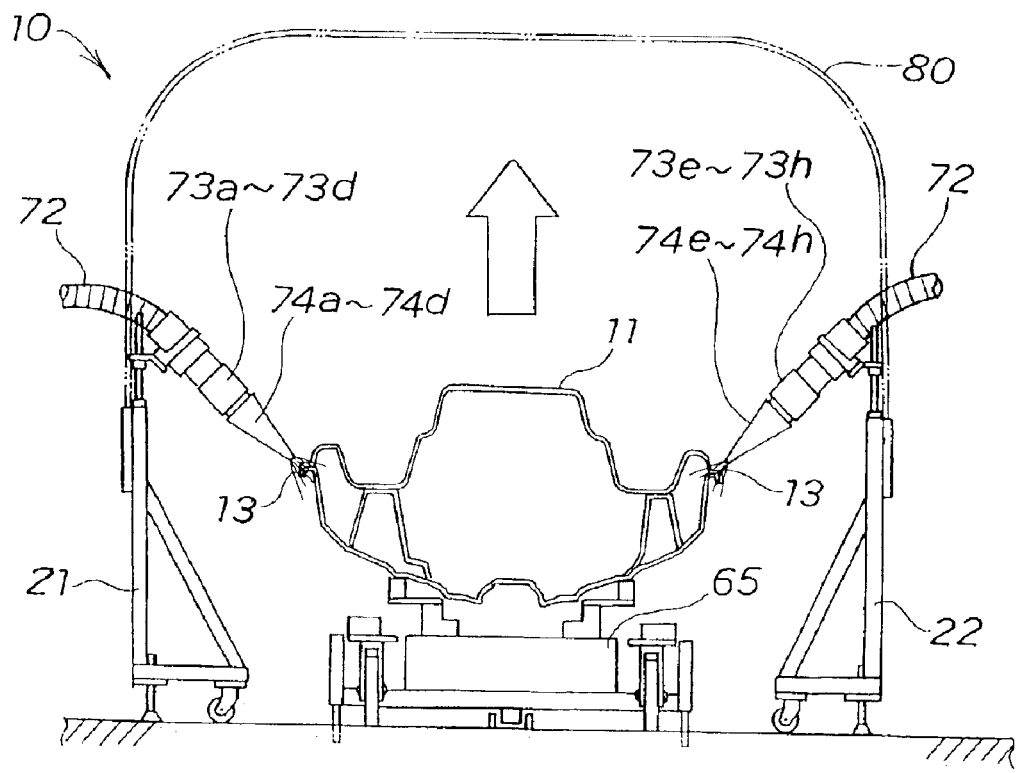

With the warm air emitted from the nozzles 74a to 74n and blown onto the peripheral edges 13 as shown in FIG. 7B, the adhesive 15 applied to the peripheral edges 13 can be cured efficiently, which can significantly reduce the necessary curing time of the adhesive 15.

At this point, the heaters 73a to 73n shown in FIG. 7A are activated to perform the heating operation, and, upon passage of a predetermined time (i.e., necessary curing time) after the first to fourth blowers 71a to 71d are activated to perform the blowing operation, the heaters 73a to 73n are deactivated to terminate their heating operation in response to signals from the control 75.

Then, upon passage of another predetermined time after the heating operation of the heaters 73a to 73n is terminated, the blowing operation of the first to fourth blowers 71a to 71d is terminated. After that, the plurality of clamps (not shown) are removed from the peripheral edges 14a and 16a of the hull 14 and deck 16, and thus the adhesive curing process of the watercraft body 11 is completed.

Figure 8A:
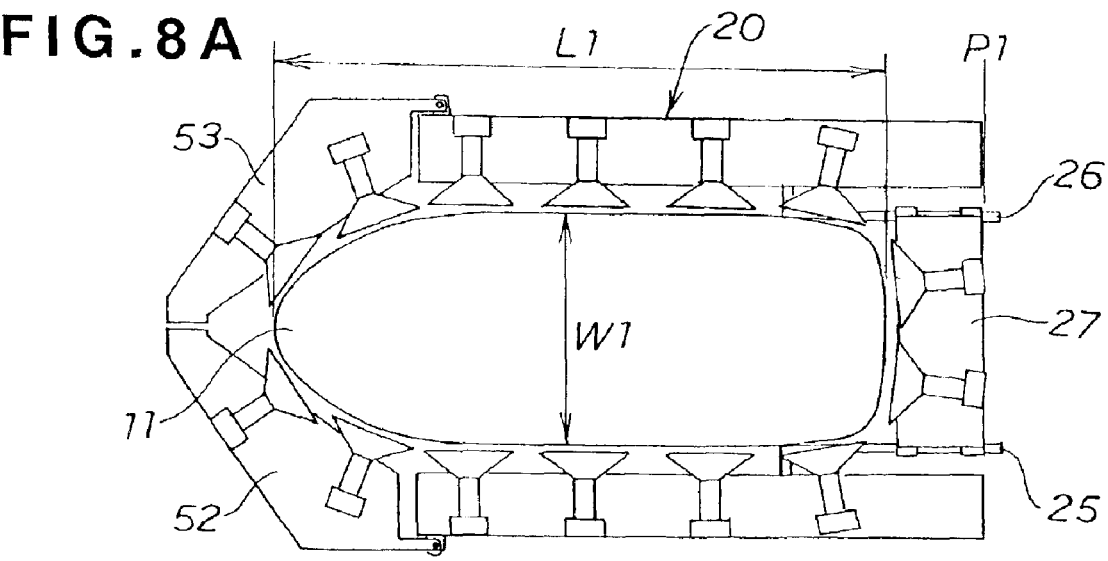
FIG. 8 is also a diagram explanatory of operation of the adhesive curing apparatus.
Figure 8B:
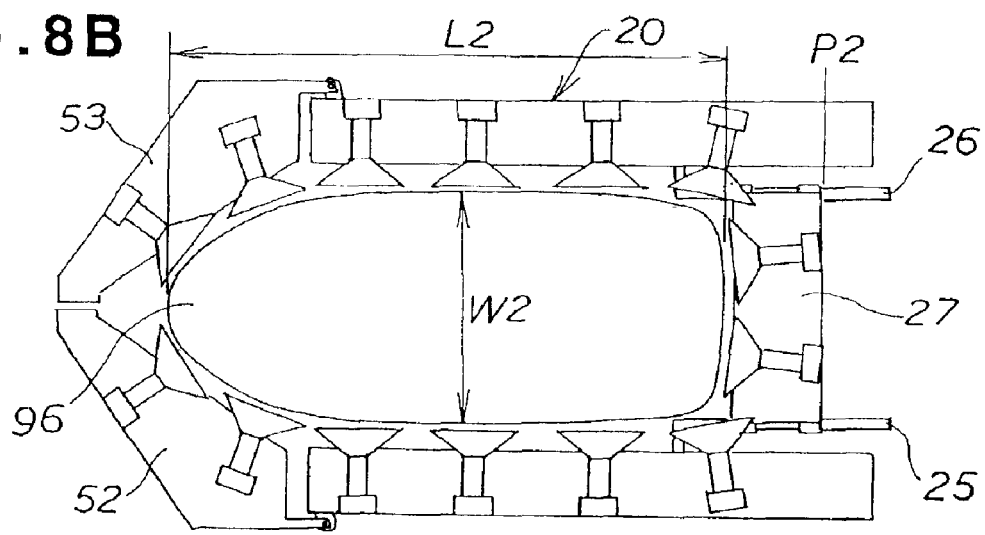
Figure 8C:
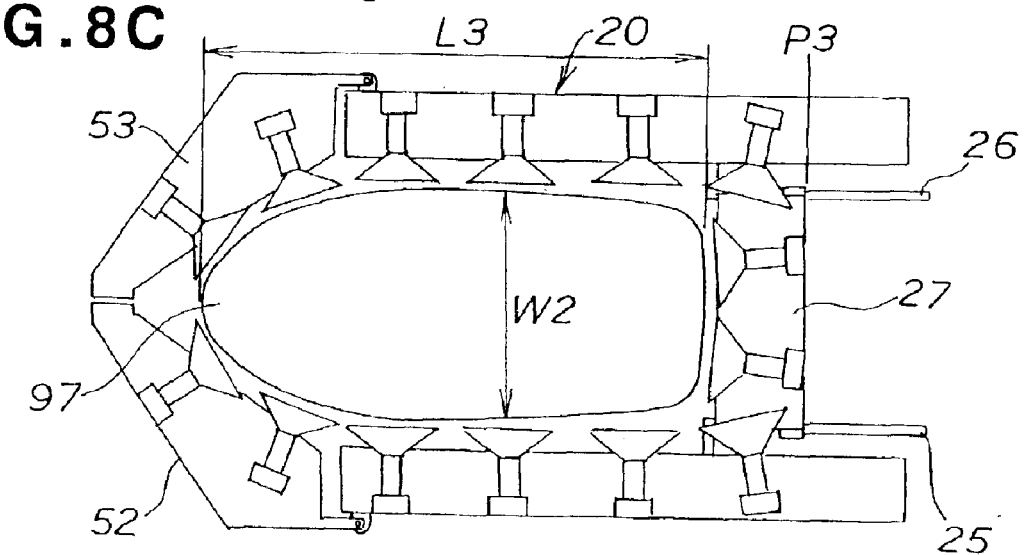
Figure 9:
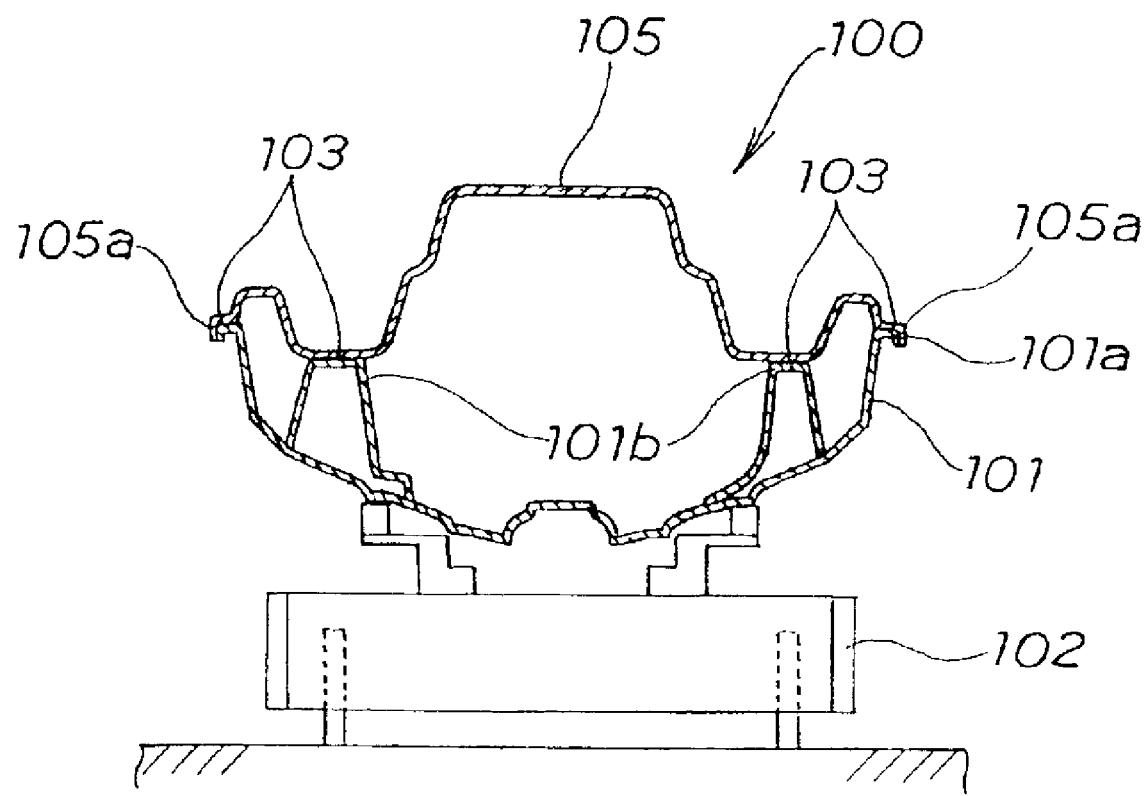
FIG. 9 is a view explanatory of a conventional manner of joining a hull and deck of a watercraft body by adhesive.

FIG. 8A is a view explanatory of operation of the adhesive curing apparatus in relation to a provisionally-assembled watercraft body 11 for three persons, FIG. 8B a view explanatory of operation of the adhesive curing apparatus in relation to a provisionally-assembled watercraft body 96 for two persons, and FIG. 8C a view explanatory of operation of the adhesive curing apparatus in relation to a provisionally-assembled watercraft body 97 for one person.

The watercraft body 11 for three persons, shown in FIG. 8A, has a width W1 and a length L1. Because the length L1 is relatively great, the sliding frame 27 is held at a rearmost position P1 so that an appropriate adhesive curing process can be performed on the watercraft body 11 for three persons.

The watercraft body 96 for two persons, shown in FIG. 8B, has a width W2 generally equal to the width W1 of the watercraft body 11 for three persons and a length L2 smaller than the length L1 of the watercraft body 11. Thus, in this case, the sliding frame 27 is held at an intermediate position P2 forward of the rearmost position P1 so that an appropriate adhesive curing process can be performed on the watercraft body 96 for two persons.

The watercraft body 97 for one person, shown in FIG. 8C, has a width W3 generally equal to the width W2 of the watercraft body 96 for two persons and a length L3 smaller than the length L2 of the watercraft body 96. Thus, in this case, the sliding frame 27 is held at a front most position P3 forward of the intermediate position P2 so that an appropriate adhesive curing process can be performed on the watercraft body 97 for one person.

With such an arrangement that the sliding frame 27 is movable toward and away from the gate 50 for positional adjustment among the rearmost position P1, intermediate position P2 and front most position P3, the same adhesive curing apparatus 10 can be applied to any one of the watercraft body 11 for three persons, watercraft body 96 for two persons and watercraft body 97 for one person, etc., which can effectively reduce the cost of necessary adhesive curing apparatus 10.

Whereas the embodiment of the present invention has been described above as including the covering 80, the covering 80 is not essential to achieve the object of the present invention and may be dispensed with.

Further, although the embodiment of the present invention has been described above in relation to FIG. 8 as applicable to the watercraft bodies for one to three persons, the present invention is not so limited; for example, the slidable amount of the sliding frame 27 may be modified so that the adhesive curing apparatus 10 can be applied to watercraft bodies for one to four or more persons.

Moreover, whereas the embodiment of the present invention has been described above as including the sliding frame 27 to allow the same adhesive curing apparatus 10 to be applied to watercraft bodies of different lengths, the sliding frame 27 is not necessarily essential to achieve the primary object of the present invention and may be dispensed with.

In summary, according to the present invention, each provisionally-assembled watercraft body to be subjected to adhesive curing can be readily carried into the curing area 100 through the openable/closeable gate without requiring a long time, and the warm wind blowing mechanism can cure the adhesive, applied between the peripheral edges of the hull and deck of the provisionally-assembled watercraft body, with an increased efficiency by blowing warm air onto the peripheral edges of the provisionally-assembled watercraft body positioned in the curing area 100. Thus, the present invention can cure the adhesive with a high efficiency at low cost.

The present disclosure relates to the subject matter of Japanese Patent Application No. 2001-370312, filed Dec. 4, 2001, the disclosure of which is expressly incorporated herein by reference in its entirety.

What is claimed is:

1. An adhesive curing apparatus for curing adhesive applied between respective peripheral edges of a hull and deck of a provisionally-assembled watercraft body, said adhesive curing apparatus comprises:
- a framework corresponding in size and shape to the provisionally-assembled watercraft body to be subjected to adhesive curing, said framework defining a predetermined curing area;
- an openable/closeable gate constituting one end portion of said framework, said gate allowing the provisionally-assembled watercraft body to be carried therethrough into said curing area in a stern-to-bow or bow-to-stern direction of the watercraft body;
- a positioning mechanism for positioning the carried provisionally-assembled watercraft body in said curing area in such a manner that said framework surrounds the provisionally-assembled watercraft body positioned in said curing area; and
- a warm air blowing mechanism for blowing warm air onto the provisionally-assembled watercraft body positioned by said positioning mechanism.

2. An adhesive curing apparatus as claimed in claim 1 wherein said framework and said gate have upper horizontal portions located generally at a same level as the peripheral edges of the provisionally-assembled watercraft body positioned in said curing area, and said warm air blowing mechanism includes a plurality of nozzles mounted at predetermined intervals on and along the upper horizontal portions of said framework and said gate, each of the nozzles being located, at a level substantially higher than the peripheral edges of the provisionally-assembled watercraft body positioned in said curing area, to eject warm air downward toward the peripheral edges.

3. An adhesive curing apparatus as claimed in claim 1 wherein said positioning mechanism includes a guide rail extending centrally of said curing area for guiding the provisionally-assembled watercraft body, carried into said curing area through said gate, toward another end portion of said framework opposite to said gate.

4. An adhesive curing apparatus as claimed in claim 1 wherein said positioning mechanism also includes a frame member provided at the other end portion of said framework, said frame member being movable toward or away from said gate so as to be variable in position in accordance with a dimension, in a front-and-rear direction, of each provisionally-assembled watercraft body to be carried into said curing area.

* * * * *